UNITED STATES PATENT OFFICE 3,322,851
Patented May 30, 1967

3,322,851
NOVEL AMINO-POLYSULFIDE POLYMERS AND THEIR REACTION PRODUCTS WITH POLYEPOXIDES
Morris B. Berenbaum, Levittown, Pa., assignor to Thiokol Chemical Corporation, Bristol, Pa., a corporation of Delaware
No Drawing. Filed June 16, 1964, Ser. No. 375,624
19 Claims. (Cl. 260—830)

The present invention relates to a novel class of liquid amino-functional polysulfide polymers, and to the novel resinous reaction products of amino-functional polysulfide polymers with polyepoxides, and further to the processes for their production.

Mercaptan-terminated polysulfide liquid polymers, such as may be symbolized by the formula $$H(SRS)_x(SR'(SH)_nS)_yH$$

where $x$ varies from 2 to 10, $y$ varies from 0 to 10, and $n$ varies from 0 to 2 and made in accordance with the teachings of U.S. Patent 2,466,963 to Patrick et al., dated Apr. 12, 1949, were revealed to form valuable resinous products with polyepoxides by Fettes and Gannon, in their U.S. Patent 2,789,958. Other valuable resinous products of the reaction of hydroxy-terminated polysulfide polymers and polyepoxides were also revealed in U.S. Patent 2,789,958. Such hydroxy-containing polysulfide polymers may be produced in accordance with the teachings of Fettes in his U.S. Patent 2,606,173. Fettes and Gannon also teach the use of aliphatic amines as catalysts to promote the formation of these valuable resinous products.

Indeed it has been found that use of amines is needed to provide practical rates of reaction between the aforesaid polysulfide polymers and polyepoxides. Many of the useful catalysts for such reactions are quite toxic, and among others include such compounds as tri(dimethylaminomethyl)phenol, diethylenetriamine, dimethylaminomethyl phenol, triethylenetetramine, dimethylaminopropylamine, diethylaminopropylamine, benzyldimethylamine, piperidine, diethylamine, dimethylaminopropionitrile, 2-ethyl hexoic acid salt of tri(dimethylaminomethyl) phenol, and m-phenylenediamine. Where no amine catalyst is used the reactants must endure unduly long cure intervals, and even where very low molecular weight polysulfide reactants and elevated cured temperatures are employed. Further, in the instance where an amine catalyst is used the practitioner suffers the inconveniences, disadvantages, and dangers inherent in weighing out and compounding into the polysulfide-polyepoxide mixtures relatively small quantities of highly active catalytic materials. These events invite high relative error in the compounding process, and thus a high degree of uncertainity in the reproducibility of the cured resinous products obtained. Another disadvantage presents itself due to dermatological irritations provided by many of these amine catalysts. To avoid these inconveniences and dangers, unusual caution must be provided in the compounding of the reactant and catalysts; these precautions increase substantially the time and cost of providing the resinous products. Another economic disadvantage in the use of amine catalyst involves the necessary use of a separate blending operation in which a small amount of amine must be uniformly dispersed into a relatively large volume of polysulfide-polyepoxide reactants. This procedure enhances the probability of providing non-uniformly cured resinous compositions due to a non-homogeneous blending of the catalyst throughout the reaction mixture. Non-uniformity of cure invites impairment of the gross physical properties of the cured resinous products, as well as a reduced ability to reproduce from batch to batch cured resinous products of similar physical properties. Still other disadvantages flow from the use of separate amine catalysts in the prior art compositions. Some amine catalysts, for example, are either insoluble in or are only partially soluble in the liquid polysulfide-polyepoxide reactants; this imparts substantial difficulties to the uniform dispersion of catalysts in reactants. Some amine catalysts will cause reversion of the solid cured resinous products, after their cure and upon aging and/or heat treatment, to provide an undesirable deterioration with time in the physical properties of the cured resinous products. It is to the remedy of these and other difficulties that the present invention is directed.

The present invention concerns the preparation and use of amino-functional polysulfide polymers, and especially their reaction with polyepoxides at economical cure rates without amine-catalysts to provide useful resinous products with enhanced properties of flexibility, stability, and utility. Fettes in his U.S. Patent 2,606,173, has revealed a method for the preparation of certain types of amino-functional polysulfide liquid polymers. Fettes presents a series of equations numbered (1) to (7), depicting the preparation of this class of amino-functional polysulfide liquid polymers, and wherein mercaptan-functional polysulfide liquid polymers are reacted with amino-mercaptans in the presence of oxygen, or oxygen contributing substances, in reversible reactions to form amino-functional polysulfide liquid polymers and water.

The Fettes and Gannon compositions and their method for providing certain amino-functional polysulfide liquid polymers suffer from several substantial disadvantages. Among these may be included (a) the necessary removal of water from the polysulfide product to prevent reversion of the product to the amino-mercaptan and mercaptan-functional polysulfide polymer reactants. The presence of water would also have a deleterious effect in the subsequent reaction of the amino-functional polysulfides and the polyepoxides. Another substantial disadvantage inherent to the Fettes and Gannon method is that it requires (b) extreme care in exactly prescribing the amount of amino-mercaptan reactant employed. Even small excesses of such mercaptan will cause substantial, excessive, multiple, and unequal scissions of the polysulfide polymer reactant and split the polymer into small unequal fragments, even to forming some monomer, viz, U.S. 2,606,173, bridging paragraph columns 4 and 5. The Fettes and Gannon process (c) makes it necessary to use only mercaptan terminated polysulfide reactants, thus limiting the choice of reactants. Further, (d) the random nature of scission at disulfide linkages of the polysulfide makes it very difficult to obtain an amino-polysulfide liquid product with a prescribable and narrowly distributed range of molecular weights as is demanded by the present state of the art to provide resinous cure products with reproducible and prescribable physical properties. Thus, although the Fettes and Gannon amino-functional polysulfide polymers may be used with polyepoxides to provide the present novel resinous products, they do not provide the versatility and uniformity that are provided by amino-functional poly-sulfide polymers of the present invention as detailed below.

It is an object of this invention to provide novel amino-functional polysulfide liquid polymers which will provide novel resinous cure products of enhanced flexibility, stability, and utility upon reaction with polyepoxides.

It is another object of this invention to provide a novel class of amino-functional polysulfide liquid polymers by reaction of chalcogen-hydric terminated polysulfide liquid polymers with alkylenimines, and a process therefor.

Another object of this invention is to provide novel resinous reaction products of amino-functional polysulfide liquid polymers and polyepoxides which have enhanced properties of flexibility, stability, and utility, and a process therefor.

Other objects of this invention are apparent from or are inherent in the following explanations and examples.

It has been unexpectedly discovered that the foregoing objects are attained through the novel compositions and processes of this invention. In particular, it has been unexpectedly found that if amino-functional polysulfide liquid polymers are formed by the reaction of relatively low molecular weight alkylenimines with liquid chalcogen-hydric terminated polysufide liquid polymers, e.g. OH or SH terminated polysulfide polymers, the latter being prepared according to the teachings of U.S. 2,606,173 and U.S. 2,466,963, respectively, that they may be reacted with polyepoxides to provide novel solid resinous cure products with enhanced properties of flexibility, stability, and utility.

The amino-functional polysulfide polymers of this invention may be described as that class of compositions having molecular structures depicted by the formula R'—L—(RSS—)$_x$R—L—R", wherein R' and R" are as follows:

the specific alkylamino groups

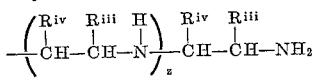

$z$ being one of 0, 1, 2, 3 and 4, R$^{iii}$ and R$^{iv}$ are the same or different and are radicals chosen from the group consisting of hydrogen, normal and branched alkyl radicals, and substituted and unsubstituted aromatic and alicyclic radicals, X is a positive number greater than 1 and R is an intervening polyvalent organic radical. Examples of such polyvalent organic radicals are those listed below in Tables A and B.

TABLE A
[Radicals having a free valence of 2]

—(CH$_2$)$_n$— ($n$=1 to 10)

CH$_3$CHCHCH$_3$
  |      |

CH$_3$CHCH$_2$
  |      |

C$_2$H$_5$CHCH$_2$CHC$_2$H$_5$
  |         |

—CH$_2$CHCH$_2$—
       |
       CH$_3$

—C$_2$H$_4$OC$_2$H$_4$OC$_2$H$_4$—

—CH$_2$OCH$_2$—

—CH$_2$SCH$_2$—

—C$_2$H$_4$SC$_2$H$_4$—

—C$_2$H$_4$OC$_2$H$_4$—

CH$_3$
                 |
—CH$_2$OCH$_2$CCH$_2$OCH$_2$—
                 |
                CH$_3$

—C$_3$H$_6$OCH$_2$OC$_3$H$_6$—

—C$_2$H$_4$OCH$_2$OC$_2$H$_4$—

—CH$_2$OCH$_2$CHOCH$_3$—
              |

—C$_2$H$_4$O⟨⬡⟩C$_2$H$_4$—

—CH$_2$OC$_2$H$_4$OCH$_2$—

—CH$_2$CH$_2$CH$_2$SCH$_2$CH$_2$CH$_2$—

—C$_2$H$_4$OCOC$_2$H$_4$—
           ‖
           O

—C$_2$H$_4$SO$_2$C$_2$H$_4$—

—CH$_2$CH=CHCH$_2$—

CH$_3$CHOCHCH$_3$
  |       |

—CH$_2$CH$_2$CH$_2$SO$_2$CH$_2$CH Cl$_2$—

CH$_3$OCHCH$_2$OCH$_2$CH$_2$OCH$_2$CH$_2$OCH$_2$CHOCH$_3$
     |                                         |

CH$_3$CH$_2$CHOCHCH$_2$CH$_3$
        |    |

CH$_3$CHCH$_2$OCH$_2$CHCH$_3$
   |               |

CH$_3$CHCH$_2$O CHCH$_2$CH$_3$
   |              |

—CH$_2$CH$_2$CH$_2$O CHC$_2$H$_5$
                  |

CH$_3$CH$_2$CH$_2$CHO CHCH$_2$CH$_2$CH$_3$
            |    |

C$_2$H$_5$CHCH$_2$O CH$_2$CHC$_2$H$_5$
     |             |

CH$_3$CHC$_2$H$_4$OC$_2$H$_4$CHCH$_3$
   |                  |

—C$_4$H$_8$OC$_4$H$_8$—

—CH$_2$CHCH$_2$—
       |
       C$_2$H$_5$

—CH$_2$OCH$_2$CHOCH$_3$
              |

—CH$_2$COCH$_2$CH$_2$OCCH$_2$—
      ‖                  ‖
      O                  O

—CH$_2$COCH$_2$CH$_2$CH$_2$OCCH$_2$—
      ‖                      ‖
      O                      O

—CH$_2$CH=CHCH$_2$CH$_2$—

—CH$_2$CH=CHCH$_2$CH$_2$CH$_2$—

—CH$_2$CH$_2$CH=CHCH$_2$CH$_2$CH$_2$—

—CH$_2$CH$_2$CH=CHCH$_2$CH$_2$—

—CH$_2$CH=CHCHCH$_3$
              |

—CH$_2$CH$_2$CH=CHCH$_2$CHCH$_3$
                      |

O                          O
       ‖                          ‖
—CH$_2$CH$_2$COCH$_2$CH$_2$CH$_2$OCCH$_2$CH$_2$—

—CH$_2$CH$_2$⟨⬡⟩CH$_2$CH$_2$CHCH$_2$CH$_3$
                              |

—CH$_2$CH$_2$CH$_2$⟨⬡⟩CH$_2$CH$_2$CHCH$_2$CH$_3$
                                  |

—CH$_2$CO(C$_2$H$_4$O)$_n$CCH$_2$—   ($n$=1 to 10)
      ‖              ‖
      O              O

—CH$_2$CH$_2$CO(C$_2$H$_4$O)$_n$CCH$_2$CH$_2$—   ($n$=1 to 10)
          ‖              ‖
          O              O

TABLE B
[Radicals having a free valence of 3 and 4]

CHCH$_2$—
—CH$_2$|

—CH$_2$COOCH$_2$CHCH$_2$OCOCH$_2$—
                 |
                 OCOCH$_2$—

CH$_2$                      CH$_2$
     |                            |
—CHCOOCH$_2$CHCH$_2$OCOCH—
                 |
                 OCOCH—
                    |
                   CH$_3$

OH
                |
—CH$_2$CH$_2$OCOCH$_2$CCH$_2$COOCH$_2$CH$_2$—
                |
                COOCH$_2$CH$_2$—

CH$_2$OCOCH$_2$—
         |
HOCH$_2$CCH$_2$OCOCH$_2$—
         |
        CH$_2$OCOCH$_2$—

—CH$_2$CHCOOCH$_2$CH$_2$—
       |

—CH$_2$CHCOOCH$_2$CH$_2$OCH$_2$CH$_2$—
       |

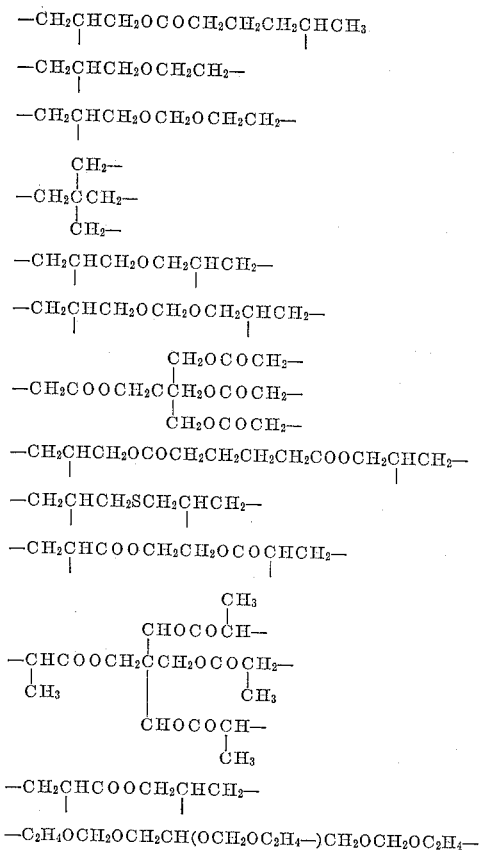

—CH₂CHCH₂OCOCH₂CH₂CH₂CHCH₃

—CH₂CHCH₂OCH₂CH₂—

—CH₂CHCH₂OCH₂OCH₂CH₂—

—CH₂C(CH₂—)(CH₂—)CH₂—

—CH₂CHCH₂OCH₂CHCH₂—

—CH₂CHCH₂OCH₂OCH₂CHCH₂—

—CH₂COOCH₂C(CH₂OCOCH₂—)(CH₂OCOCH₂—)CH₂OCOCH₂—

—CH₂CHCH₂OCOCH₂CH₂CH₂CH₂COOCH₂CHCH₂—

—CH₂CHCH₂SCH₂CHCH₂—

—CH₂CHCOOCH₂CH₂OCOCHCH₂—

—CHCOOCH₂C(CH₃)(CHOCOCH—CH₃)(CHOCOCH—CH₃)— with CH₃ groups

—CH₂CHCOOCH₂CHCH₂—

—C₂H₄OCH₂OCH₂CH(OCH₂OC₂H₄—)CH₂OCH₂OC₂H₄—

The most useful amino-functional polysulfide polymers of this invention are those which are normally liquid at 25° C. and have a molecular weight of at least 400, and in the range of 400 to 10,000; where $R^i$ and $R^{ii}$ are

$-(CH_2-CH_2-NH-)_z-CH_2CH_2-NH_2$ and/or

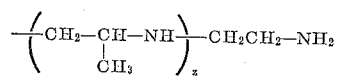

$-(CH_2-CH-NH-)_z-CH_2CH_2-NH_2$ with CH₃ and/or

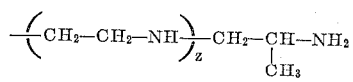

$-(CH_2-CH_2-NH-)_z-CH_2-CH-NH_2$ with CH₃ and/or

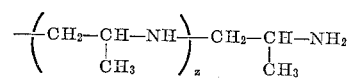

$-(CH_2-CH-NH-)_z-CH_2-CH-NH_2$ with CH₃ on each $z$ being one of 0 and 1; and where $x$ is a positive number greater than 2.

The novel process by which the present class of amino-functional polysulfide polymers may be prepared may be generally summarized as follows:

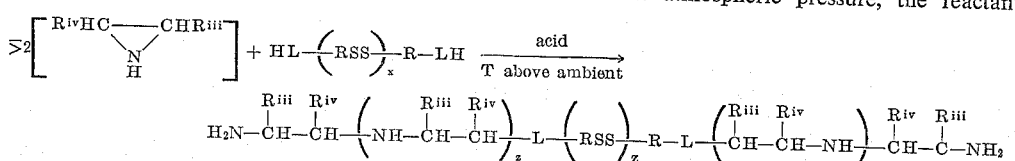

$$\geq 2\left[\begin{array}{c}R^{iv}HC\underset{\underset{H}{N}}{\diagup\diagdown}CHR^{iii}\end{array}\right] + HL-(RSS)_x-R-LH \xrightarrow[\text{T above ambient}]{\text{acid}}$$

$$H_2N-\overset{R^{iii}}{\underset{}{C}}H-\overset{R^{iv}}{\underset{}{C}}H-(NH-\overset{R^{iii}}{\underset{}{C}}H-\overset{R^{iv}}{\underset{}{C}}H)_z-L-(RSS)_x-R-L-(\overset{R^{iii}}{\underset{}{C}}H-\overset{R^{iv}}{\underset{}{C}}H-NH)_z-\overset{R^{iv}}{\underset{}{C}}H-\overset{R^{iii}}{\underset{}{C}}-NH_2$$

wherein —L— is —O—, or —S—, and x, R, $R^{iii}$, $R^{iv}$, and z are as previously defined, and —LH is a chalcogen-hydric radical.

To form the present amino-functional polymers, —SH, and/or —OH functional polysulfide liquid polymers are mixed and heated in the presence of an acid catalyst with an imine, defined as above, in the ratio of at least one mole of imine per equivalent weight of a chalcogen-hydric terminated polysulfide, the latter equivalent being defined in conventional terms of mercaptan, and/or hydroxy functionality. Useful polymer products are obtained thereby where in fact not every —LH grouping may be reacted, and where the polymer product may give evidence of the presence of both reactive amine and reactive —LH groupings. To provide faster curing polysulfides of this invention one may increase the ratio of equivalents of reactive amine to reactive —LH groupings present in the polymeric product. One method that may be used is to increase the charge ratio of mols-of-imine/mol-of-polysulfide above 2:1; in certain instances ratios of 10:1 and even higher are usefully employed.

The present invention contemplates the use of mixtures of different alkylenimines, such as occurs where the $R^{iii}$ and/or $R^{iv}$ radicals in the component alkyleneimines are different, to form other novel amino-functional polysulfide polymers of this invention, some molecules of which have the same and some dissimilar terminals. This would occur, for example, where a mixture of ethylenimine and propylenimine was used to yield a liquid product wherein some polymer molecules have —CH₂—CH₂—NH₂ terminals only, and some

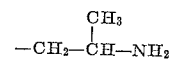

$-CH_2-\overset{CH_3}{\underset{}{C}}H-NH_2$ terminals only, some polymer molecules would have both CH₂—CH₂—NH₂ and

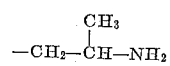

$-CH_2-\overset{CH_3}{\underset{}{C}}H-NH_2$ terminals, and yet some others would have —LH and either —CH₂—CH₂—NH₂ or

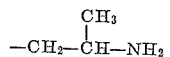

$-CH_2-\overset{CH_3}{\underset{}{C}}H-NH_2$ terminals. At any one time therefore the amino-functional polysulfide compositions of the present invention would contain molecules with active amine terminals which may be either the same or different, depending upon whether one or more than one imine reactant was used in their formation, and in addition would contain some molecules with —LH terminals.

The presence of acid values, whether provided for by the —LH terminals of —LH polysulfide polymer alone or, in addition, by a separate acid catalyst, say salt-type Lewis acids or organic or inorganic acids, are believed necessary to the formation of the present alkyl amino-functional polysulfide polymers. While such novel polymers usually may be formed in the absence of a separate acid catalyst, the presence of the latter, it is believed, facilitates cleavage of the imine ring and thus promotes faster joining of the resultant alkylamino radical to the polymer backbone. This is believed to be especially important where it is desired that the z values of the alkylamino groupings be greater than 1.

In the process to prepare the present alkyl amino-functional polysulfide polymers elevated temperatures are used to facilitate reaction. In certain embodiments performed at atmospheric pressure, the reactants, usually in the presence of a separate acid catalyst such as glacial acetic acid, are elevated to temperatures approaching the normal boiling point of the imine component, there to reflux for from one to 24 hours until the level of mercaptan and/or hydroxyl content of the polysulfide component has fallen to a constant level. In other embodiments the formation of these polymers may be carried out in enclosed vessels under an external application of heat with autogenic pressures created that may be in excess of one atmosphere.

Amino-functional polysulfide polymers of this invention are liquids which have viscosities very similar to those of the —LH terminated polysulfide reactants employed in their making; they exhibit toxicities that are substantially less than those exhibited by mixtures of —LH polysulfide polymers and the prior art catalysts often used to promote and enter into polysulfide-polyepoxide resin reactions; further, the physical and chemical characteristics of the present amino-functional polysulfide compositions provide for no greater handling problems than those of the —LH terminated polysulfide reactants used in their preparation. The process of the invention makes it apparent that the distribution of molecular weights of the present amino-functional polysulfide polymer products closely follows the distribution of molecular weights of the —LH terminated polysulfide reactants. No scission of polysulfide molecules occurs as it does in the Fettes and Gannon process. Further, no water is produced as a by-product as it is in the Fettes and Gannon process.

Polyepoxide materials react with the above described liquid amino-functional polysulfide polymers to form desirable resinous products. The polyepoxides are preferably liquids which have an average epoxide functionality of approximately two epoxide groups per molecule of polyepoxide material. The position of epoxide groups in the polyepoxide material is not critical to the practice of this invention. For instance, if the polyepoxide material is essentially linear in structure epoxide groups may be in terminal positions or they may be positioned intermediately and/or randomly along the linear structure. Polyepoxide materials which may enter into cure with the above defined polysulfide polymers include the following types of materials:

(1) Essentially linear types such as

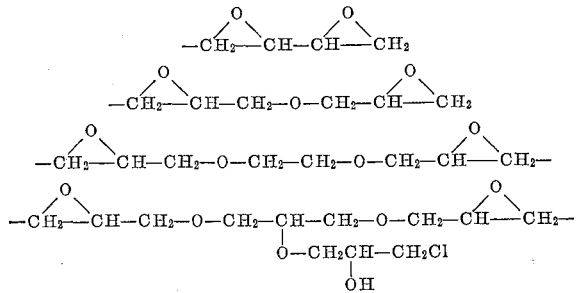

and epoxidized polybutadiene materials such as those which have an epoxide functionality of four or more and which are sold under the designation "Oxiron" resins, i.e., "Oxiron 2000," "Oxiron 2001" and "Oxiron 2002";

(2) Epichlorohydrin-bisphenol A types which are aromatic in nature and which include those sold under the trademark designation "Tipox," i.e., "Tipox A," "Tipox B," and "Tipox C," those sold under the designation "Epon" resins, i.e., "Epon 828" annd "Epon 820," those sold under the designation "Bakelite ERL" resins, and those sold under the designation "Epi-Rez" resins, i.e., Epi-Rez 510;

(3) Cyclo-aliphatic types which include those sold under the designation "Unox" resins, i.e., "Unox 206," which is epoxy ethyl-3,4-epoxy cyclohexane and "Unox 201," which is 3,4-epoxy-6-methylcyclohexylmethyl-3,4-epoxy-6-methylcyclohexanecarboxylate;

(4) Resorcinol diglycidyl ether types which include those sold under the designation "Kopoxite" resins, i.e., "Kopoxite 159";

(5) Epoxy novalak type which includes the resins sold under the designations "Dow Epoxy Novalak 438" and "DEN 438–EK 85," and also those sold under the designation "KER" resins, i.e., "KER 357A" and "KER 955A";

(6) Epoxidized fatty acid resins including the Epoxol materials such as "Epoxol 9-5"; and others. In certain instances some solid polyepoxide materials may be used, say where a finely distributed uniform dispersion with liquid polysulfide polymers may be obtained, or where the solid polyeproxides are soluble either in the polysulfides or in a common cosolvent with polysulfides. Useful polyepoxide materials according to the practice of this invention have epoxide equivalent weights of 100 to over 4000. Thus within the requirements here taught a practitioner in the art may choose from among a wide variety of polyepoxide materials as to specific epoxide equivalent values, specific molecular configuration, molecular weight and functionality to pursue practice of this invention for specific end uses.

The novel solid resinous cure products of this invention are obtained by reaction between the present amino-functional polysulfide polymers and the above defined polyepoxide materials according to a simple process. They are mechanically admixed to form a uniform liquid blend or dispersion and then are permitted to cure within some given temperature range within from ambient temperatures to about 150° C. The reactants where liquid are usually completely compatible one with the other. Once blended together the polyepoxides and amino-functional polysulfides, after an induction period known as the "pot life," and which is dependent upon the nature of the reactive components and the temperature, will perceptively cure to useful solid flexible resinous compositions. In some end uses, where desired, tacky or tack-free solid products may be obtained depending upon the quantities and types of reactants used. Cure rate is importantly dependent upon the chemical nature of the specific system of coreactants used, and the temperature of cure. In some instances at specific temperatures, solid resinous compositions are obtained within 15 minutes of blending, and other instances with other specific coreactants at these same specific temperatures it may require days to obtain the desired solid compositions. In general, faster rates of cure will be obtained where the ratio of amino/—LH equivalents in the polysulfide is increased, where the temperature of cure is increased, further where lower molecular weight coreactants are used, and even further where epoxide functionality of the polyepoxide chosen is increased.

The range of useful ratios of weight proportions of polyepoxides to that of the present amino-functional polysulfide polymers suitable for cure in present practice extends from less than about 1:5 to more than about 5:1. It has been found however that the most useful resinous compositions are obtained where the ratios of weight proportions of polyepoxides to that of amino-functional polysulfides fall within the range of 1:2 to that of 2:1.

The present range of useful cure temperatures extend from below common room temperatures, 20 to 25° C., to above 150° C.; this also offers wide choice to the practitioner to suit the requirements of specific end uses, pot life and cure times and thus imparts added utility to the present invention.

Amino terminated polysulfide polymers produced according to the practice of this invention find use as flexibilizing agents in resinous products of reaction with polyepoxide materials and unexpectedly provide unusually desirable working properties both to the liquid formulations prior to cure, and to the solid resinous products obtained after cure. Working properties include among others excellent brushing characteristics while fluid prior to cure in the setting down of brushed film formulations.

After cure films are obtained which not only exhibit excellent adhesion to substrates but also show superior flexibility, impact resistance and toughness to that shown by the reaction products of —SH and —OH polysulfides with polyepoxides. Also cured castings produced with the present reaction products unexpectedly possess unusual degrees of flexibility, far out of proportion to that which may be expected from prior art experience with castings formed as the reaction products of —LH terminated polysulfides and polyepoxides taught by U.S. 2,789,958. Separate catalysts are not needed to practice this invention. The present amino-functional polysulfide polymers present further substantial advantage in that they will react, in general, far more rapidly with polyepoxide materials than will analogous prior art —LH terminated polysulfides in the absence of separate amine catalysts. Yet, further, the novel liquid polysulfide polymers of this invention may be compounded into cure systems with polyepoxide materials with far greater ease, in less time, with a greater degree of compatibility and homogeneity and with less danger from toxicity than may prior art systems employing separate amine catalysts. These substantial advantages and others are obtained through use of compositions of the present invention.

The following examples are given to more fully explain the nature of the present invention, but are merely illustrative and do not seek to limit its scope as defined by the claims.

EXAMPLE 1

*LP–8 polysulfide/ethylenimine reaction product, AFP–1*

Amino-functional polysulfide polymer, AFP–1, was prepared as the reaction product of a low molecular weight (about 500 to 700) liquid mercaptan terminated polysulfide polymer, designated herein as LP–8 polysulfide polymer and having essentially the structure

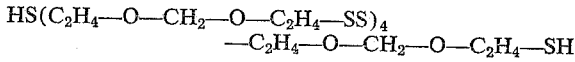

and ethylenimine in molar charge ratio of 1:2 as follows:

Under a blanket of nitrogen gas, a one-liter resin pot equipped with a mechanical stirrer, reflux condenser open to the atmosphere, addition funnel, and gas inlet and outlet tubes, the latter connected to a 0° C. cold trap, was charged with 335 g. (0.5 mol) of LP–8 polysulfide polymer (mercaptan content 9.85% by weight) and 47.3 g. (1.1 mols, providing a 10% mol excess of imine) of ethylenimine. The mixture was stirred without heating for about 2 hours, and then at 45–50° C. for an additional 2.5 hours. Unreacted volatiles were removed from the reaction mass by distillation and vacuum treatment. The polymer product obtained, AFP–1, was a brown viscous liquid having a mercaptan content of 3.62% and a nitrogen content of 5.47%. This corresponded to a polymeric product having an average molecular weight of about 756. Product weight yield was 95.2% of theoretical.

EXAMPLE 2

*AFP–2, AFP–3 polymers, and polyepoxide cure products*

Amino-functional polysulfide polymers AFP–2 and AFP–3 were prepared as the reaction products of a mercaptan terminated polysulfide polymer having a molecular weight of about 990, designated herein as LP–3 polysulfide polymer and having essentially the structure

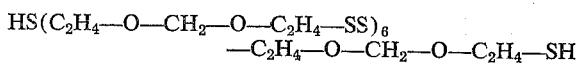

and ethylenimine as follows:

Under a blanket of nitrogen gas, a one-liter resin pot, equipped as in Example 1, was charged with 495 g. (0.5 mol of LP–3 polysulfide polymer (mercaptan content 6.67% by weight) and 47.7 g. (1.11 mols) of ethylenimine. The mixture was stirred without heating for about 2.5 hours, the color changing from dark brown to salmon, and then at 40–55° C. for an additional 7.5 hours. Upon further heating for two hours at distillation temperatures of 56–130° C. no distillate was collected. The slightly clouded liquid pot product was filtered and then treated with mild heating under vacuum to produce AFP–2, an amber viscous liquid polymer having a mercaptan content of 1.95% and a nitrogen content of 1.59%. Product weight yield 471.5 g. was approximately 87.7% of theoretical. AFP–2 was further treated with ethylenimine to provide an amino-functional polymer, AFP–3, having no reactive mercaptan groups: 451 g. of AFP–2 and 23.3 g. (0.538 mol) of ethylenimine were reacted together following the above procedure described for the preparation of AFP–2. The amber viscous liquid polymer product AFP–3 was obtained in 440.8 g. yield, and had a mercaptan content of 0.0% and a nitrogen content of 2.51% by weight.

AFP–3 amino-functional polysulfide polymer and an epichlorohydrin-bisphenol A type polyepoxide of approximate epoxide equivalent of 185, designated herein as Epon 828, were mixed in various proportions and permitted to cure. The solid resinous products obtained were compared with those obtained by an otherwise identical cure process using comparable amounts of the prior art cure system LP–3 mercaptan terminated polysulfide polymer-Epon 828 polyepoxide-tri(dimethylaminomethyl)phenol. The recipes used and properties obtained are described in Table I. It is accepted in the art that hardness is proportionally related to flexibility.

TABLE I.—RESINOUS CURE PRODUCTS OF AFP–3 AND LP–3 POLYSULFIDE POLYMERS WITH POLYEPOXIDE EPON 828

| | 1 | 2 | 3 | 4 | 5 | 6 | 7 |
|---|---|---|---|---|---|---|---|
| Recipe: | | | | | | | |
| AFP–3, pbw | 100 | 145 | 200 | | | | |
| LP–3, pbw | | | | 100 | 145 | 200 | 100 |
| Epon 828, pbw | | 100 | 100 | 100 | 100 | 200 | 100 |
| Tri(dimethylaminomethyl) phenol, pbw | | | | 10 | 10 | 10 | |
| Cure Properties: | | | | | | | |
| 80° F. Cure time, hrs | 48 | 48 | 48 | 0.5 | 1 | 2 | (¹) |
| Hardness, Shore A: | | | | | | | |
| After 2 days at 80° F | 42 | 58 | 54 | 95 | 96 | 57 | (¹) |
| After 2 hours at 212° F | 46 | 71 | 62 | 90 | 97 | 57 | (¹) |

¹ No cure.

EXAMPLE 3

*AFP–4 polymer and polyepoxide cure products*

In this example larger charge ratios of ethylenimine to mercaptan terminated polysulfide polymer are used with an acid reaction promoter to produce AFP–4, a different alkyl amino-functional polysulfide polymer than those obtained in Examples 1 and 2. No nitrogen blanket was used.

To a one-gallon resin pot was charged 2000 grams (2 mols) of LP–3 polysulfide polymer and 568 grams (13.2 mols) of ethylenimine with stirring. The pot contents increased in temperature to 75° C. The temperature exotherm subsided, the pot contents falling to 58° C.; they were then maintained at 58° C. with heating for a three hour period to permit reflux of ethylenimine. At this point about 3–4 milliliters of water were added to the pot and carbon dioxide was bubbled through the reaction mass to aid mixing and to slightly acidify the mixture. The contents were then permitted to react at reflux temperatures for an additional three hours. At this point 25 ml. of glacial acetic acid were added dropwise to the pot mixture. The pot contents were again permitted to react at reflux temperatures for an additional 4 hours. The product obtained was then vacuum stripped of volatile materials; 19 grams of the latter were thus collected. AFP–4, the polymeric product obtained, was a very light amber viscous liquid having a viscosity of 23 poises at 22° C.

Twenty-grams of AFP–4 and 20 grams of epichlorohydrin-bisphenol A type polyepoxide Tipox B, epoxide equivalent 175–210, were mixed together and permitted to stand overnight at about 20–25° C.; a rubbery flexible nontacky, resinous cure product was thus obtained.

In further study of cure properties of the foregoing compositions comparison was made between cure rates and product properties obtained with a comparable prior art system, the latter consisting of an —SH terminated LP–3 polysulfide polymer, Tipox B, and the cure accelerator tri(dimethylaminomethyl)phenol, and with the cure systems of AFP–4 and Tipox B. Recipes and properties of such systems are listed in Table II below:

EXAMPLE 4

*LP–3 polysulfide/LP–2 polysulfide/ethylenimine reaction product AFP–5*

In this example a mixture of intermediate molecular weight —SH terminated polysulfide of about 1000, designated as LP–3 polysulfide and higher molecular weight about 4000, mercaptan terminated liquid polysulfide polymer, designated as LP–2 polysulfide having essentially the structure

TABLE II.—AMINO-FUNCTIONAL POLYSULFIDE POLYMER AFP–4 AND PRIOR ART CURE SYSTEMS

|  | 1 | 2 | 3 | 4 | 5 |
|---|---|---|---|---|---|
| Recipe: |  |  |  |  |  |
| LP–3, pbw | 100 | 100 | 100 |  |  |
| AFP–4, pbw |  |  |  | 100 | 100 |
| TIPOX B, pbw | 100 | 200 | 100 | 100 | 200 |
| Tri(dimethylaminomethyl)phenol, pbw | 10 | 20 |  |  |  |
| Working and Cure Properties of 50 Gram Samples at 80° F.: |  |  |  |  |  |
| Pot Life, Hrs | 0.3 | 0.25 | No cure | 4–20 | 4–20 |
| Max. Temp. Rise, ° F | 240 | 265 |  | 86 | 84 |
| Color of Casting | Dark amber | Dark amber |  | Amber | Amber |
| Clarity of Casting | Clear | Clear |  | Clear | Clear |
| Hardness, Shore D: |  |  |  |  |  |
| After 1 day | 56 | 70 |  | 21 | 10 |
| After 2 days | 60 | 75 |  | 47 | 15 |
| After 3 days | 63 | 75 |  | 61 | 23 |
| After 5 days | 69 | 75 |  | 61 | 23 |
| After 7 days | 70 | 75 |  | 70 | 36 |
| After 14 days | 70 | 78 | No cure | 70 | 55 |
| Properties of 10 Mil. Films Brushed on Steel Panel: |  |  |  |  |  |
| Tack Free Time, Hrs | 6 | 5 | No cure | 4–20 | 4–20 |
| Adhesion | Excellent | Excellent | None | Good | Good |
| Physical Properties After 7 Days' Cure at 80° F.: |  |  |  |  |  |
| Tensile Strength,a p.s.i | 2,800 | 6,900 | None | 2,220 | 300 |
| Elongation,a percent | 26 | 10 |  | 36 | 72 |
| Hardness, Shore D | 69 | 75 |  | 62 | 32 |
| Impact, Resistance,b ft./lbs | 69 | 2.8 |  | 94 | 17 |
| Physical Properties After 7 Days' Cure at 80° F., Plus 70 Hrs. at 212° F.: |  |  |  |  |  |
| Tensile strength,a p.s.i | 850 | 6,000 | None | 5,560 | 2,250 |
| Elongation,a percent | 65 | 10 |  | 12 | 36 |
| Hardness, Shore D | 35 | 75 |  | 80 | 65 | a ASTM Method: D638–58T.
b Falling Ball Method: MIL–C–16923, Bur. of Ships.

AFP–4 was also mixed with equal weight (25 g.) quantities of other polyepoxides, and epoxidized soy bean oil, designated herein as "Epoxol 9–5," epoxidized polybutadiene of two different epoxide equivalent values, one designated as "Oxiron 2000" and the other as "Oxiron 2001," and cycloaliphatic diepoxides of two different molecular structures, one designated as "Unox 201" and the other as "Unox 206." These mixtures were set at 212° F. over a weekend, for some 67 hours, to yield the resinous products described in Table III below.

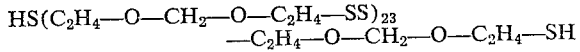
$$HS(C_2H_4-O-CH_2-O-C_2H_4-SS)_{23}$$
$$-C_2H_4-O-CH_2-O-C_2H_4-SH$$

was reacted with ethylenimine in a solvent. The solvent was used to reduce the viscosity of the pot mixture and facilitate mixing. AFP–5, the amino-functional polysulfide polymer product, was of higher average molecular weight than the polymers AFD–3 and AFD–4 prepared in Example 3.

A mixture of 430 g. (0.1 mol) of LP–2 polysulfide polymer, 430 g. (0.4 mol) of LP–3 polysulfide polymer TABLE III.—AFP–4 CURE SYSTEMS WITH POLYEPOXIDES OF SOY BEAN OIL, POLYBUTADIENE AND CYCLOALIPHATIC MATERIALS

|  | 1 | 2 | 3 | 4 | 5 | 6 | 7 | 8 | 9 | 10 |
|---|---|---|---|---|---|---|---|---|---|---|
| Recipe: |  |  |  |  |  |  |  |  |  |  |
| LP–3, pbw | 100 |  | 100 |  | 100 |  | 100 |  | 100 |  |
| AFP–4, pbw |  | 100 |  | 100 |  | 100 |  | 100 |  | 100 |
| Oxiron 2001, pbw | 100 | 100 |  |  |  |  |  |  |  |  |
| Oxiron 2000, pbw |  |  | 100 | 100 |  |  |  |  |  |  |
| Unox 201, pbw |  |  |  |  | 100 | 100 |  |  |  |  |
| Unox 206, pbw |  |  |  |  |  |  | 100 | 100 |  |  |
| Epoxol, 9–5, pbw |  |  |  |  |  |  |  |  | 100 | 100 |
| Cure Properties after 67 hrs. at 212° F.: |  |  |  |  |  |  |  |  |  |  |
| State of Cure | None | (1) | None | (1) | None | (2) | None | (3) | None | (4) |
| Hardness: |  |  |  |  |  |  |  |  |  |  |
| Shore A |  | 45 |  | 56 |  | 10–20 |  | 55–70 |  | 51 |
| Shore D |  |  |  |  |  |  |  |  |  |  |

1 Firm flexible rubber.
2 Soft rubber with cold flow.
3 Hard rubber.
4 Soft rubber.

and 167.5 g. (3.6 mols) of ethylenimine and 500 ml. of benzene was stirred in a glass resin pot fitted with a reflux condenser. The temperature of the reactant mixture was elevated until reflux (69–72° C.) of ethylenimine occurred, and was maintained there for 5½ hours with agitation. The pot contents were permitted to cool to room temperature overnight. They were further heated and maintained at 74° C. for 9 hours with stirring, the pot contents again being permitted to cool overnight. They were further heated to 72° C., for an additional 4¼ hours then permitted to cool overnight; then further heated to 72° C. for an additional 8 hours, then permitted to cool overnight; then heated for an additional 8 hours, then permitted to cool overnight; and then being heated for yet an additional 5 hours before the reaction was terminated. The pot product was treated by placing it under reduced pressure with mild heating to remove volatile materials. AFP-5, the polymeric product obtained, contained 0.78% by weight of mercaptan and 1.41% in nitrogen as compared with the original mixture of LP-2 and LP-3 which had 3.78% by weight of mercaptan and 0.0% in nitrogen. AFP-5, a light brown liquid polymer having a viscosity of 125 poises, was obtained in 99% was obtained in 99% weight yield of theoretical.

EXAMPLE 5

Autoclave preparation of AFP-6 polymer

In this example, AFP-6, another amino-functional polysulfide polymer of this invention was prepared in an autoclave under greater than atmospheric autogenic pressures, and then cured with several epichlorohydrin-bisphenol A type polyepoxides, Epon 828, Epi-Rez 510, both being similar with epoxide equivalent of about 185-200 and viscosity of about 110-140 poises and with Epon 820, which has a lower viscosity of about 50-60 poises and an epoxide equivalent content of about 180-200.

To a one gallon autoclave equipped with a mechanical stirrer was added 1300 g. of LP-3 polysulfide polymer and 370 g. of ethylenimine. The autoclave was purged with nitrogen and then sealed. The reactor was then heated to temperatures in the range of 240-270° F. over a 3 hour period. Pressures rose to 97.5 p.s.i.g. within the first 30 minutes of heating and then subsequently fell to 8 p.s.i.g. at the close of the reaction. The crude product was produced in 1574 g. yield or 94.25% of theoretical. The polymeric product was of similar color to the LP-3 polysulfide polymer initially charged, being only slightly darker and more viscous. Solids appeared in suspension in the crude product and were removed by filtering. The crude product was then treated by heating under reduced pressure and at 54° C. over a 3 hour period. The purified product, AFP-6, had a nitrogen content of 6.35% and a mercaptan content of 0.0%. The LP-3 polysulfide polymer used as a reactant had a mercaptan content of 6.5% and a nitrogen content of 0.0%. The product thus obtained, AFP-6, was then cured with several polyepoxides as described in Tables IV, V and VI.

TABLE IV.—CURED PRODUCTS OF AFP-6 AND EPON 828

|  | 1 | 2 | 3 |
|---|---|---|---|
| Recipe: |  |  |  |
| AFP-6, pbw | 100 | 100 | 200 |
| Epon 828, pbw | 200 | 100 | 100 |
| Cure Properties at 80° F.: |  |  |  |
| Cure time, min | 84 | 30 | 107 |
| Hardness of cured rubber | Very firm | Firm | Soft |

TABLE V.—CURED RUBBERY PRODUCTS OF LP-3 AND AFP-6 WITH EPI-REZ 510

|  | 1 | 2 | 3 |
|---|---|---|---|
| Recipe: |  |  |  |
| LP-3, pbw | 100 |  | 100 |
| AFP-6, pbw |  | 100 |  |
| Epi-Rez 510, pbw | 100 | 100 | 100 |
| Tri(dimethylaminomethyl) phenol, pbw | 10 |  |  |
| Properties of 50 G. Casting Cures at 80° F.: |  |  |  |
| Pot Life in Hours | 1.0 | 0.33 |  |
| Max. temperature Rise Upon Mixing, ° F | 140 | 250 |  |
| Tack Free Time, Hrs | 6 | 4-20 | No cure |
| Hardness, Shore D, After— |  |  |  |
| 1 day | 45 | 56 |  |
| 2 days |  | 60 |  |
| 3 days |  | 63 |  |
| 5 days | 60 | 79 |  |
| 7 days | 65 | 70 |  |
| 14 days | 65 | 70 |  |

TABLE VI.—CURE PRODUCTS OF LP-3 AND AFP-6 WITH EPON 820

|  | 1 | 2 | 3 |
|---|---|---|---|
| Recipe: |  |  |  |
| LP-3, pbw | 100 |  | 100. |
| AFP-6, pbw |  | 100 |  |
| Epon 820, pbw | 200 | 200 | 200. |
| Tri(dimethylaminomethyl) phenol, pbw | 20 |  |  |
| Properties—80 Gram Casting Cures at 80° F.: |  |  |  |
| Cure Time, Min | 30 | 85 | No cure. |
| Mixing Exotherm Peak, ° F | 246 | 188 | None. |
| Color of Casting | Amber | Amber | No cure. |
| Clarity of Casting | Clear | Clear |  |
| Hardness, Shore | A    D | A    D |  |
| 24 hrs. at R.T | 95   65 | 80   30 |  |
| 48 hrs. at R.T | 95   65 | 85   35 |  |
| 72 hrs. at R.T | 95   68 | 85   43 |  |
| 5 days at R.T | 95   68 | 85   48 |  |
| 14 days at R.T | 95   70 | 95   75 |  |
| Properties—80 Mil Cast Film: |  |  |  |
| Tack free time, hrs | 48 | 48 | No cure. |
| Adhesion | Very good | Very good | None. |
| Hardness, Shore | A    D | A    D |  |
| 5 days at R.T | 90   40 | 90   40 |  |
| Properties—3 Mil Brushed Film: |  |  |  |
| Brush Behavior | Fair | Very good |  |
| Tack free time, hrs | 48 | 48 | No cure. |
| Adhesion | Very good | Very good | No adhesion. |

EXAMPLE 6

AFP-7 polymer and its polyepoxide cure products

In this example, AFP-7, an amino-functional polysulfide polymer of this invention, was obtained upon reaction of ethylenimine and LP-3 polysulfide polymer in molar charge ratio of 4:1 by employing 1400 g. of LP-3 polysulfide polymer and 265.3 g. of ethylenimine according to the procedure described in Example 5. AFP-7, a viscous liquid product was dark reddish-brown in color and had a nitrogen content of 2.08% and a mercaptan content of 0.0%. Reaction between AFP-7 and the polyepoxide Epon 820 was studied and compared with that of a conventional cure system as described in Table VII below.

TABLE VII.—CURE PRODUCTS OF AFP-7 AND POLYEPOXIDE EPON 820

|  | 1 | 2 |
|---|---|---|
| Recipe: |  |  |
| AFP-7, pbw | 100 |  |
| LP-3, pbw |  | 100. |
| Epon 820, pbw | 200 | 200. |
| Tri(dimethylaminomethyl) phenol, pbw | 20 |  |
| Properties—80 Gram Casting at 80° F.: |  |  |
| Tack Free Time | 30 min | 72 hrs. |
| Mixing Exotherm, ° F | 246 | 130. |
| Color of Casting | Amber | Amber. |
| Clarity of Casting | Clear | Clear. |

| Hardness, Shore Durometer | A | D | A | D |
|---|---|---|---|---|
| 72 hrs. at R.T | 95 | 65 | 5 | 5 |
| 5 days at R.T | 95 | 68 | 5 | 5 |
| 14 days at R.T | 95 | 70 | 60 | 20 |

| Properties—80 Mil Cast Film Cure at 80° F.: |  |  |
|---|---|---|
| Set Time, Hrs | 24 | 48. |
| Track Free Time, Hrs | 48 | 72. |
| Adhesion | Very good | Very good. |
| Flexibility | Stiff | Rubbery. |

| Hardness, Shore Durometer | A | D | A | D |
|---|---|---|---|---|
| 5 days at R.T | 90 | 40 | 20 | 8 |

| Properties—3 Mil Brushed Film at 80° F.: |  |  |
|---|---|---|
| Brush Behavior | Fair | Very good. |
| Tack Free Time, Hrs | 48 | 5 days. |
| Adhesion | Very good | Very good. |

EXAMPLE 7

*AFP-8 polymer and its polyepoxide cure products*

In this example another alkyl amino functional polysulfide polymer, AFP-8, was prepared substantially as has been described in Example 5, in a 2:1 mol ratio of ethylenimine to LP-3 polysulfide polymer using 1600 g. of the latter and 151.4 g. of the former. 1570 g. of crude product (89.5% yield) were obtained thereby; it was filtered, washed with water and then dried to produce a final product AFP-8 having a mercaptan content of 0.0% and 1.62% in nitrogen.

Cure of AFP-8 with the polyepoxide Epon 820 was compared to that of a conventional system as described in Table VII below.

TABLE VIII.—CURE PROPERTIES OF AFP-8 WITH POLYEPOXIDE EPON 820 COMPARED WITH A PRIOR ART SYSTEM

|  | 1 | 2 | 3 |
|---|---|---|---|
| Recipe: |  |  |  |
| AFP-8, pbw |  | 100 |  |
| LP-3, pbw | 100 |  | 100. |
| Epon 820, pbw | 100 | 100 | 100. |
| Tri(dimethylaminomethyl) phenol, pbw | 10 |  |  |
| Properties—80 Gram Sample Cures at 80° F.: |  |  |  |
| Tack Free Time, Mins | 32 | >48 hours | No cure. |
| Exotherm Peak, ° F | 248 | 92 |  |
| Color of Casting | Amber | Amber | Do. |
| Clarity of Casting | Clear | Clear | Do. |

| Hardness, Shore Durometer | A | D | A | D |
|---|---|---|---|---|
| 24 hrs. at R.T | 65 | 20 |  |  |
| 48 hrs. at R.T | 65 | 20 |  |  |
| 72 hrs. at R.T | 65 | 20 | 25 | 5 |
| 5 days at R.T | 65 | 20 | 38 | 10 |
| 14 days at R.T | 65 | 20 | 50 | 18 |

| Properties—80 Mil Cast Film at 80° F.: |  |  |  |
|---|---|---|---|
| Tack Free Time, Hrs | 24 | 24 | No cure. |
| Adhesion | Fair | Fair | No adhesion. |

| Hardness (Shore) | A | D | A | D |
|---|---|---|---|---|
| 5 days at R.T | 100 | 60 | 50 | 20 | No cure. |

| Properties—3 Mil Brushed Film at 80° F.: |  |  |  |
|---|---|---|---|
| Brush Behavior | Good | Very good |  |
| Tack Free Time, Hrs | 48 | 48 | No cure. |
| Adhesion | Good | Good | No adhesion. |

EXAMPLE 8

*Preparation of AFP-9 polymer*

In this example AFP-9, yet another alkyl amino-functional polysulfide polymer, was prepared employing a mol charge ratio of 10:1 of ethylenimine:LP-3 polysulfide polymer according to the procedure described in Example 5. The product produced an amber, viscous liquid having a mercaptan content of 0.0%, and 8.75% in nitrogen.

EXAMPLE 9

*AFP-10 polymer product of LP-3 polysulfide polymer and propylenimine*

In this example propylenimine was used with the mercaptan terminated polysulfide polymer to prepare AFP-10, another alkyl amino-functional polysulfide polymer of this invention.

LP-3 polysulfide polymer (1,000 g., 1 mol) and propylenimine (376.9 g., 6.6 mols) were charged to a resin pot fitted with a reflux condenser and feed funnel. The pot contents were agitated with a mechanical stirrer, the temperature rising to 64° C. Heat was applied elevating the pot contents to 79° C. and permitting reflux of propylenimine to occur over the next eleven hour period. A small quantity of glacial acetic acid catalyst was slowly added to the reaction vessel over a 2 hour period, the pot contents being maintained at between 88–95° C. Reflux temperatures were then maintained for an additional 5½ hours before the reaction was shut down. Volatiles were removed from the reaction mixture through distillation, the recovery of 98.9 g. of unreacted propylenimine being obtained thereby. The product AFP-10 obtained was a viscous polymeric liquid having a mercaptan content of 0.35% and a nitrogen content of 4.11%.

Cure products of AFP-10 with polyepoxide Tipox B were examined as described in Table IX.

TABLE IX.—CURE RECIPE AND PRODUCTS OF AFP-10 AND POLYEPOXIDE TIPOX B

| | 1 | 2 |
|---|---|---|
| Recipe: | | |
| AFP-10, pbw | 100 | 100. |
| Tipox B, pbw | 100 | 200. |
| Properties of 50 g. Casting Cure at 80° F.: | | |
| Color of Casting Obtained | Light amber | Light amber. |
| Clarity of Casting | Clear | Clear. |
| Hardness, Shore A: | | |
| 1 day | Pourable | Pourable. |
| 2 days | Very soft | Very soft. |
| 7 days | 70 | Soft, sticky. |
| Properties of 10 mil Brushed Film on Steel Panel: | | |
| Tack Free Time | 8 days | 2 weeks, still tacky. |
| Adhesion to steel panel | Fair | Fair. |
| Physical Properties, 7 day cure at 80° F.: | | |
| Tensile strength, p.s.i | 415 | |
| Elongation, percent | 103 | |
| Physical Properties, 7 day cure at 80° F. and 70 hrs. at 212° F.: | | |
| Tensile strength, p.s.i | 2,210 | 1,525. |
| Elongation, percent | 50 | 92. |
| Hardness, Shore A | 66 | 62. |

EXAMPLE 10

*AFP-11 polymer product of LP-3 polysulfide polymer and 2,2'-dimethylethylenimine*

In this example 500 g. of LP-3 polysulfide polymer and 234.63 g. of 2,2'-dimethylethylenimine were reacted according to the procedure of Example 9 to produce AFP-11, an amber viscous alkyl amino-functional polymer having a mercaptan content of 0.36% and a nitrogen content of 2.8%.

Thus having revealed in detail the nature, utility, and advantages of this invention by structure, equations, disclosures which are included herein by reference, e.g. pertinent patents, and by embodiments as are given in the examples.

I claim:

1. The solid resinous reaction products of polyepoxides and amino-functional polysulfide polymers, said polyepoxides having an epoxide functionality of at least approximately 2 and said polysulfide polymers having a structure corresponding to the formula

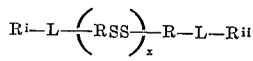

wherein $R^i$ and $R^{ii}$ are the alkylamino group

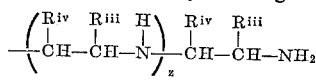

and wherein $z$ is a number being one of 0, 1, 2, 3, and 4, $R^{iii}$ and $R^{iv}$ are radicals selected from the group of radicals consisting of hydrogen, normal and branched alkyl radicals, and substituted and unsubstituted aromatic and alicyclic radicals, R is an intervening polyvalent organic radical, $x$ is a number greater than one, and —L— is a radical selected from the group of radicals consisting of —O— and —S— radicals.

2. The solid resinous reaction products of polyepoxides and amino-functional polysulfide polymers as in claim 1 wherein said $R^{iii}$ and $R^{iv}$ are hydrogen, and said —L— is the radical —S—.

3. The solid resinous reaction products of polyepoxides and amino-functional polysulfide polymers as in claim 1 wherein at least one of said $R^{iii}$ and $R^{iv}$ is the normal alkyl radical —CH$_3$.

4. The process for providing solid resinous reaction products of polyepoxides and amino-functional polysulfide polymers comprising (A) admixing to physical uniformity at least one polyepoxide and at least one amino-functional polysulfide polymer in weight proportions of about 1:5 to 5:1, and (B) curing to a solid the admixture of step A at temperatures of 20° C. to 150° C., said polyepoxides having an epoxide functionality of at least approximately 2 and said amino-functional polysulfide polymers having a structure corresponding to the formula

wherein $R^i$ and $R^{ii}$ are the alkylamino group

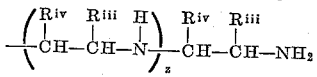

and wherein $z$ is a number that is one of 0, 1, 2, 3 and 4, $R^{iii}$ and $R^{iv}$ are radicals selected from the group of radicals consisting of hydrogen, normal and branched alkyl radicals, and substituted and unsubstituted aromatic radicals and alicyclic radicals, R is an intervening polyvalent organic radical, $x$ is a number greater than one, and —L— is a radical selected from the group of radicals consisting of —S— and —O—.

5. The process for providing solid resinous reaction products of polyepoxides and amino-functional polysulfide polymers as in claim 4 wherein said curing is pursued for at least 15 minutes.

6. An amino-functional polysulfide polymer with a structure corresponding to the formula

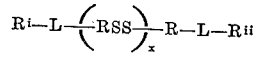

wherein $R^i$ and $R^{ii}$ are the alkylamino group

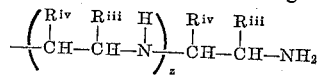

and wherein $z$ is a number that is one of 0, 1, 2, 3, and 4, $R^{iv}$ and $R^{iii}$ are radicals selected from the group of radicals consisting of hydrogen, normal and branched alkyl radicals, aromatic radicals and alicyclic radicals, R is an intervening polyvalent organic radical, $x$ is a number greater than one, and —L— is a radical selected from the group of radicals consisting of —S— and —O—.

7. An amino-functional polysulfide polymer as in claim 6 which is a liquid at 25° C.

8. An amino-functional polysulfide polymer as in claim 6 which has a molecular weight of from about 400 to about 10,000.

9. An amino-functional polysulfide polymer as in claim 6 wherein said $R^{iii}$ and $R^{iv}$ are hydrogen.

10. An amino-function polysulfide polymer as in claim 6 wherein at least one of said $R^{iii}$ and $R^{iv}$ is methyl.

11. A process for providing an amino-functional polysulfide polymer comprising (A) admixing to a uniform acidic mixture at least one alkylenimine and at least one chalcogen-hydric terminated polysulfide polymer that is normally liquid at 25° C. of the structure corresponding to the formula

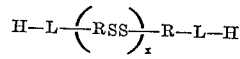

wherein R is an intervening polyvalent organic radical, $x$ is a number greater than one, and —L— is a radical selected from the group of radicals consisting of —S— and —O—, in the mol ratio of at least 2:1; and (B) heating the admixture formed in step A to temperatures above ambient for such periods until the mercaptan content of the admixture has become substantially constant.

12. A process for providing an amino-functional polysulfide polymer as in claim 11 wherein said alkylenimine is ethylenimine.

13. A process for providing an amino-functional polysulfide polymer as in claim 11 wherein said alkylenimine is propylenimine.

14. A process for providing an amino-functional polysulfide polymer as in claim 11 wherein said alkylenimine is 2,2′-dimethylethylenimine.

15. A process for providing an amino-functional polysulfide polymer as in claim 11 wherein said —L— radical is —S—.

16. A process for providing an amino-functional polysulfide polymer as in claim 11 wherein said heating is at a temperature at least that of the normal boiling point of said alkylenimine.

17. A process for providing an amino-functional polysulfide as in claim 11 wherein said admixing further comprises admixing therein an acid catalyst selected from the group of acid catalyst consisting of Lewis acids, organic acids, and inorganic acids.

18. An amino-functional polysulfide polymer with a structure corresponding to the formula

wherein $R^i$ and $R^{ii}$ are the alkylamino group

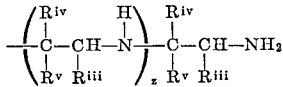

and wherein $z$ is a number that is one of 0, 1, 2, 3 and 4, $R^v$, $R^{iv}$, and $R^{iii}$ are radicals selected from the group of radicals consisting of hydrogen, normal and branched alkyl radicals, aromatic radicals and alicyclic radicals, R is an intervening polyvalent organic radical, $x$ is a number greater than one, and —L— is a radical selected from the group of radicals consisting of —S— and —O—.

19. An amino-functional polysulfide polymer as in claim 18 wherein at least one of $R^v$, $R^{iv}$, and $R^{iii}$ is methyl.

No references cited.

MURRAY TILLMAN, *Primary Examiner.*

P. LIEBERMAN, *Assistant Examiner.*